(12) United States Patent
Payne et al.

(10) Patent No.: US 8,678,812 B2
(45) Date of Patent: Mar. 25, 2014

(54) FILL SYSTEM FOR FORMING MACHINES

(75) Inventors: Richard A. Payne, Plymouth, WI (US); Anthony Owen, Eau Claire, WI (US)

(73) Assignee: Tomahawk Manufacturing, Inc., Sheboygan, WI (US)

( * ) Notice: Subject to any disclaimer, the term of this patent is extended or adjusted under 35 U.S.C. 154(b) by 626 days.

(21) Appl. No.: 12/800,887

(22) Filed: May 25, 2010

(65) Prior Publication Data

US 2011/0293806 A1 Dec. 1, 2011

(51) Int. Cl.
*B29C 45/18* (2006.01)
(52) U.S. Cl.
USPC .......................... 425/572; 264/328.8; 425/574

(58) Field of Classification Search
USPC ................................ 425/572, 574; 264/328.8
See application file for complete search history.

(56) References Cited

U.S. PATENT DOCUMENTS

| | | | |
|---|---|---|---|
| 4,043,002 A | 8/1977 | Brackman | |
| 4,356,595 A | 11/1982 | Sandberg et al. | |
| 4,371,008 A | 2/1983 | Freisier | |
| 4,821,376 A | 4/1989 | Sandberg | |
| 4,872,241 A * | 10/1989 | Lindee | 425/573 |
| 7,591,644 B2 | 9/2009 | Sandberg et al. | |
| 7,993,126 B2 * | 8/2011 | Sandberg et al. | 425/186 |
| 2008/0233230 A1 * | 9/2008 | Sandberg et al. | 425/190 |

\* cited by examiner

*Primary Examiner* — Tim Heitbrink
(74) *Attorney, Agent, or Firm* — Philip M. Weiss; Weiss & Weiss

(57) ABSTRACT

A hold-down tooling package that maintains the dimensional integrity between the product manifold, shear and fill plate.

16 Claims, 5 Drawing Sheets

FILL SYSTEM FOR FORMING MACHINES

FIELD OF THE INVENTION

The present invention relates to a hold-down tooling package that maintains the dimensional integrity between the product manifold, shear and fill plate.

BRIEF DESCRIPTION OF THE PRIOR ART

U.S. Pat. No. 4,043,002 relates to a patty machine for forming successive patties of a predetermined size from a quantity of bulk product. The machine includes a charging chamber in which the product is pressure-fed into a patty mold cavity by means of intermeshing, positive displacement, self-wiping compressor screws. The product is delivered from a feed hopper to the entrance of the charging chamber by means of the conveyor screws which operate on a demand basis to convey the product to the compressor screws. Shafts for driving and supporting the conveyor and compressor screws extend throughout the length of the machine and each carries one conveyor and one compressor screw.

U.S. Pat. No. 7,591,644 relates to a counter-balanced mold plate for a food patty molding machine. The mold plate is used in a reciprocating mold plate that the forming apparatus which includes a flat body having a plurality of cavities for forming patties. The flat body has a fill side face and an opposite face. A grid pattern of grooves is formed on the second face extending longitudinally and laterally on the second face. The pattern extends a lateral distance that is equivalent to an overall cavity field width. Longitudinal and lateral slots that penetrate through a thickness of the mold plate and flow connect fill side pressure and meet with the pattern of grooves on the second face to balance the pressure on the opposite faces of the flat body.

U.S. Pat. No. 4,356,595 relates to an apparatus that includes a multi-orifice plate interposed in the outlet end of a fill passage extending from a food pump to a cyclically reciprocating mold plate.

U.S. Pat. No. 4,371,008 relates to a multi orifice fill place and uses a stripped plate slidably mounted immediately adjacent the fill plate. The stripper plate has fill openings that align one to one for the fill plate orifices when the stripper plate is in a fill location.

U.S. Pat. No. 4,821,376 relates to a food patty molding machine that comprises a multi-orifice fill plate interposed in the fill passage immediately adjacent the mold plate and a stripper plate.

SUMMARY OF THE INVENTION

The present invention relates to a hold-down tooling package that maintains the dimensional integrity between the product manifold, shear and fill plate.

The present invention relates to a hold down design used on standard fill plates. The hold down assembly prevents flexing of the fill plate and shear plate and fill plate that can cause performance and wear like problems in the tooling.

The present invention relates to a hold-down tooling device comprising: a space keeper placed around a shear plate and below a fill plate; and a hold down device placed within said fill plate and a hold down assembly center support. The device is placed within a product manifold.

It is an object of the present invention for the device to prevent flexing of the fill plate and the shear plate.

It is an object of the present invention for the device to prevent the fill plate from having any spaces or gaps with the shear plate.

The present invention relates to a hold down tooling device comprising: a fill assembly with a center hold down comprising a fill plate; a shear plate and center supports. The center supports comprise a mounting stud and nut. The center support is connected to the shear plate and fill plate. Space keepers are attached to the fill plate.

It is an object of the present invention to improve shearing.

It is an object of the present invention to decrease clogging. In the prior art with traditional tooling, the fill plate flexes which causes clogging. In the present invention, flatness of the fill plate is maintained by the hold down assembly of the present invention.

It is an object of the present invention to maintain the flatness of the fill plate and shear plate so that the cutting edge stays true and sharp edges maintain their proximity to each other.

It is an object of the present invention to improve product fiber cutting.

It is an object of the present invention to improve product fiber column definition.

It is an object of the present invention for the former to be able to cycle with less product pressure required to fill cavities.

It is an object of the present invention to have less drag on the mold plate at higher strokes per minute.

It is an object of the present invention to have a longer tooling life.

It is an object of the present invention to eliminate mold plate chattering. Mold plate chattering is eliminated because there is less drag from the dimensional integrity of the system of the present invention.

It is an object of the present invention to provide soft textured products without sacrificing machine performance.

The present invention relates to a method for producing food patties. Augers bring meat into a pump box. Plungers push the meat into a manifold while other plungers are being filled. The product that is pushed into the manifold has tremendous pressure. The shear plate obstructs holes in the fill plate. The shear plate moves to line up holes in the shear plate with holes in the fill plate. When closed, the product cannot go to the mold plate. The hold down assembly counteracts the pressure stated above. The hold down assembly counteracts pressure when the device is open or closed. The above method maintains dimensional integrity. The flatness of the device improves the shearing process. This creates better columns in the food patties.

The present invention relates to a method for filling a mold plate with product comprising: moving a shear plate beneath a fill plate transverse to the mold plate. The shear plate and fill plate are held with a hold down assembly. The mold plate is filled with product. The shear plate is moved to a closed position and the product is sheared.

DETAILED DESCRIPTION

Figure 1:
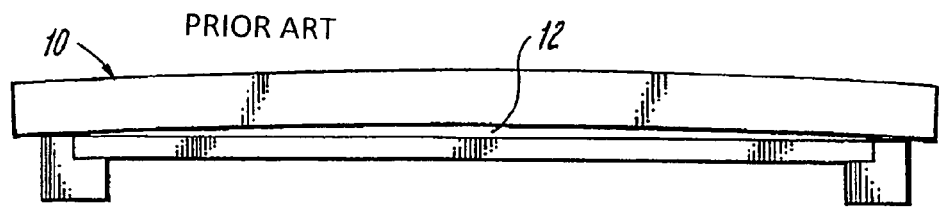
FIG. 1 shows a fill plate flexing with a traditional tooling setup.

FIG. 1 shows the fill plate 10 flexing on a traditional tooling setup showing a gap 12.

Figure 2:
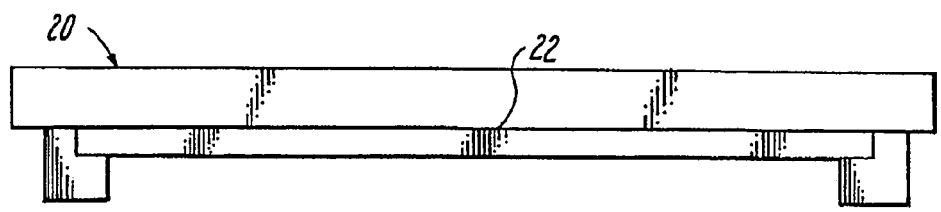
FIG. 2 shows the fill plate having the hold down assembly of the present invention.

FIG. 2 shows a fill plate 20 having no space 22 or gap showing.

Figure 3:
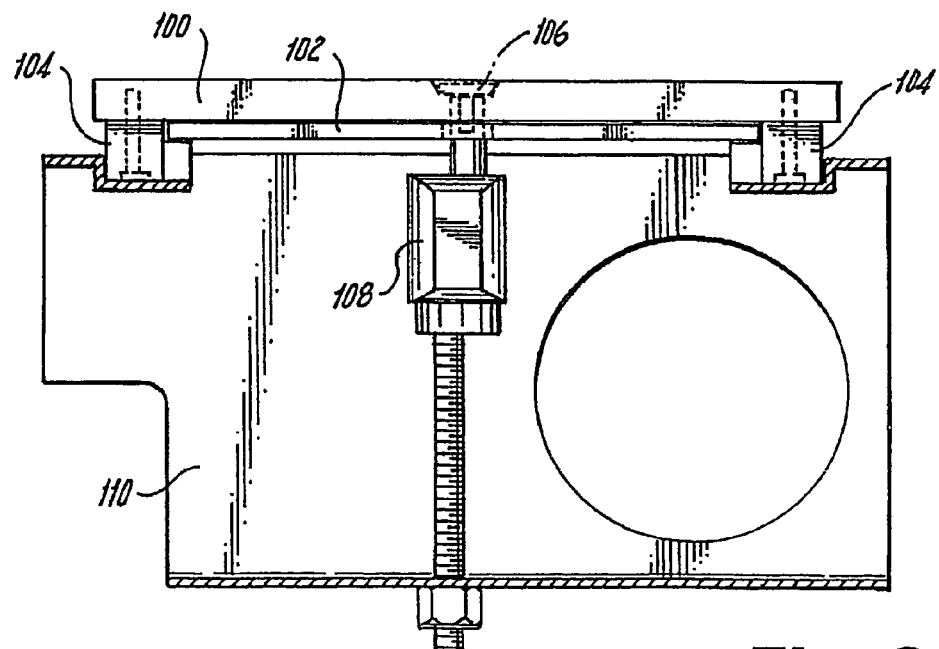
FIG. 3 shows the device of the present invention with the product manifold

FIG. 3 shows the fill plate 100 above the shear plate 102. The shear plate space keeper 104 keeps the shear plate and fill plate from allowing any gaps. The hold down screw 106 increases the fill plate 100 flatness while allowing the shear plate 102 to shift. The hold down screw 106 is kept within the hold down assembly center support 108. The entire device is placed within the product manifold 110.

Figure 4:
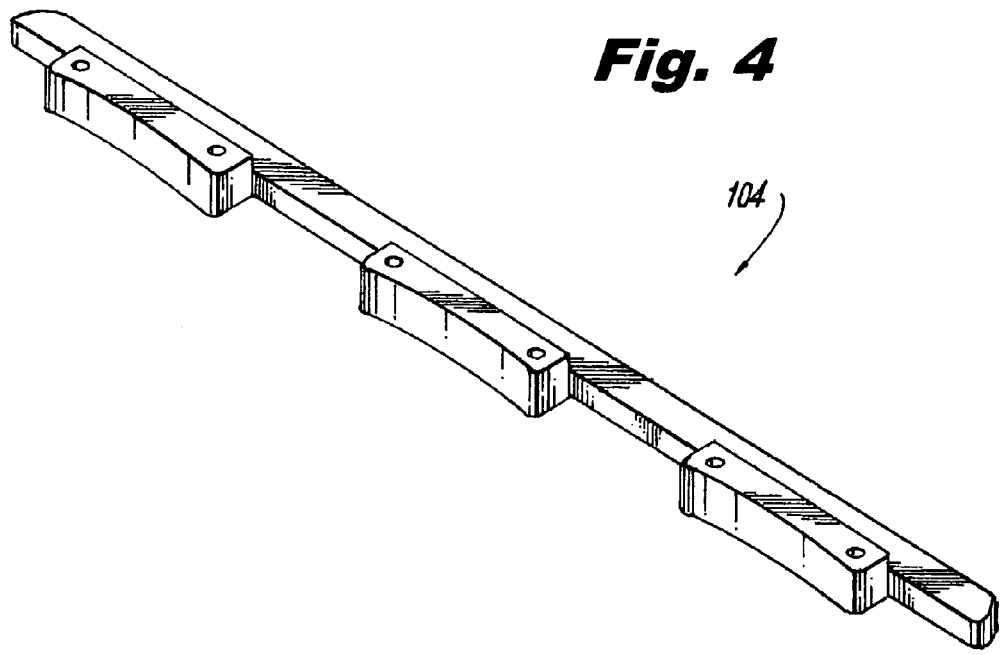
FIG. 4 shows the keeper/spacer of the present invention.

FIG. 4 shows the spacer/keeper 104.

Figure 5:
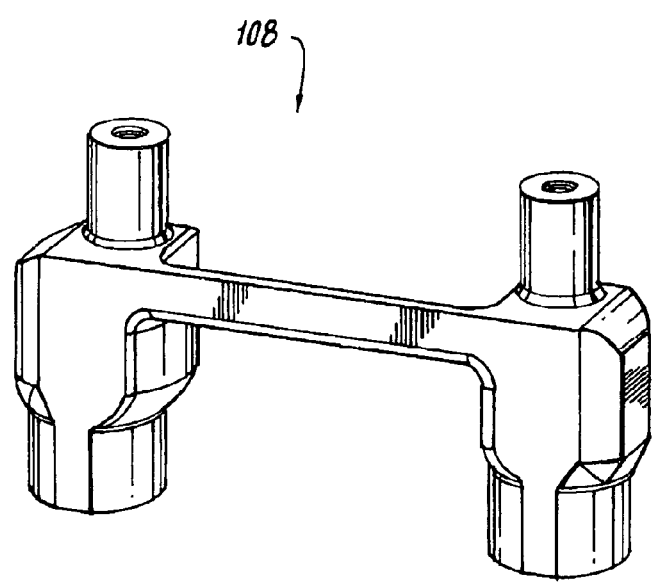
FIG. 5 shows the hold down assembly center support of the present invention.

FIG. 5 shows the hold down assembly center support 108.

Figure 6:
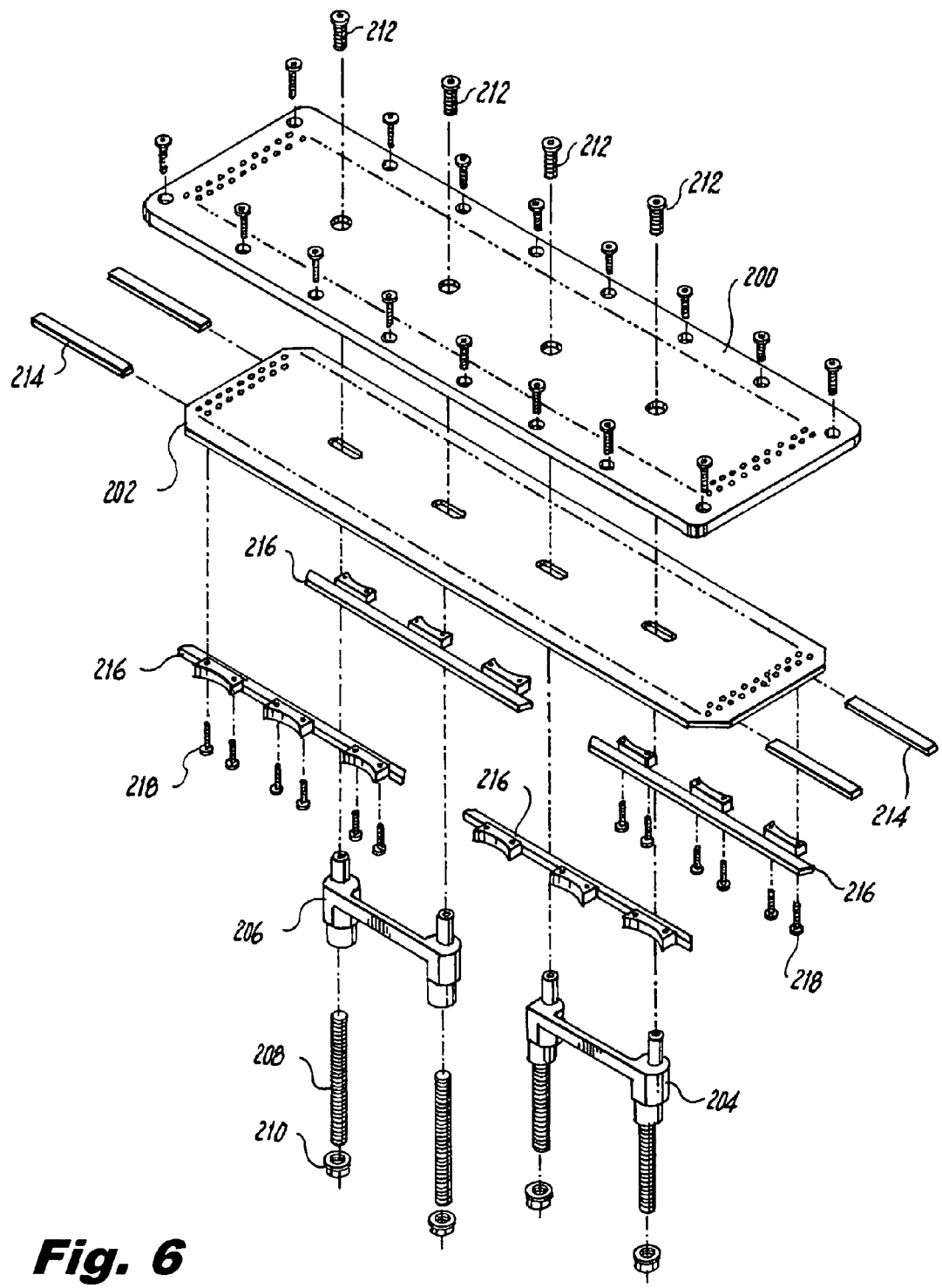
FIG. 6 shows the fill assembly and hold down assembly of the present invention.
Figure 7:
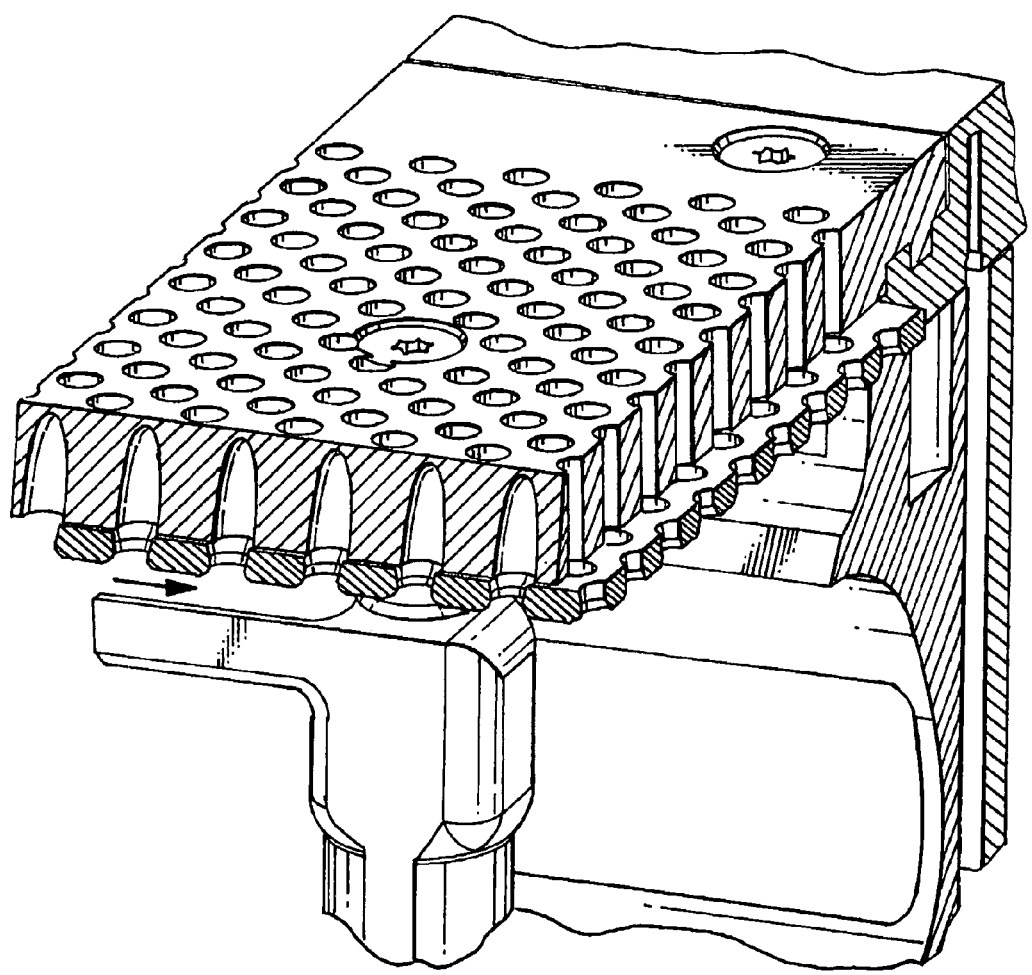
FIG. 7 shows a cross sectional view of the shear plate of the present invention in the open position.
Figure 8:
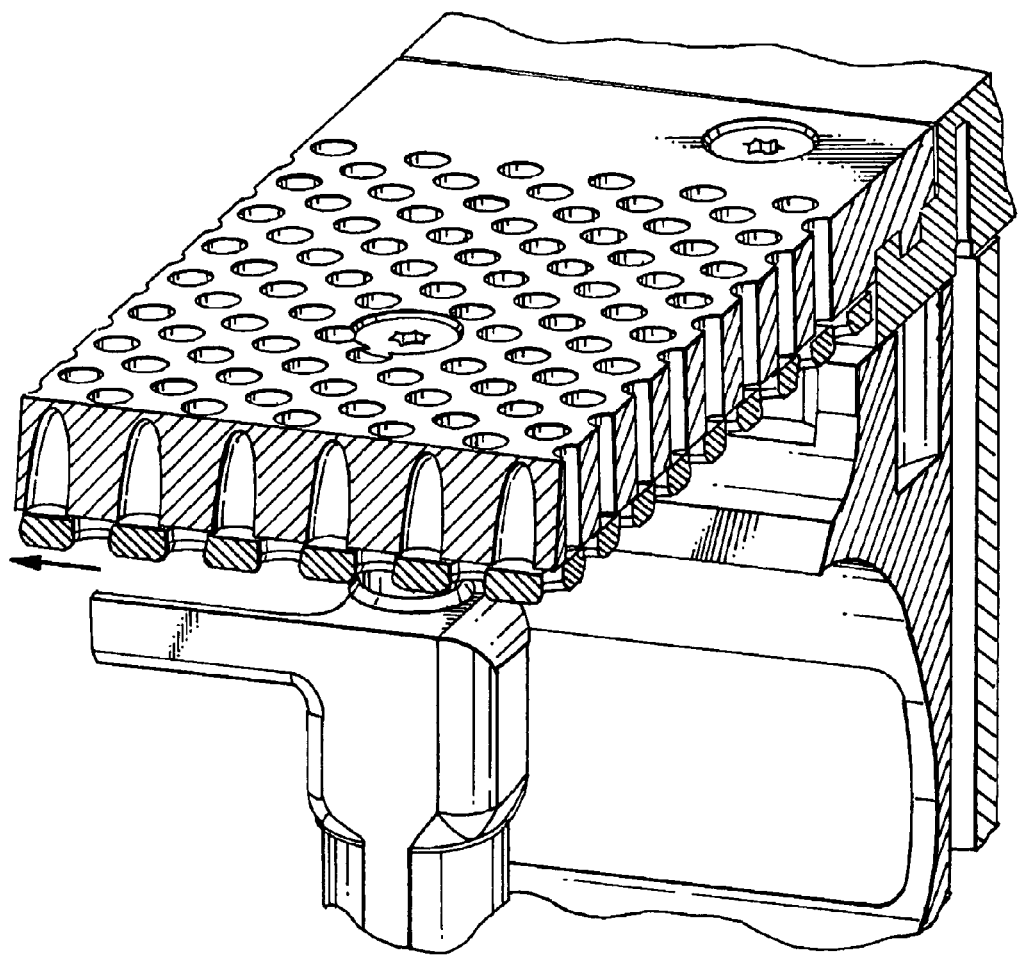
FIG. 8 shows a cross sectional view of the shear plate of the present invention in the closed position.

FIG. 6 shows a fill assembly with a center hold down comprising a fill plate. A fill plate 200, a shear plate 202, having center supports 204 and 206. The center support having a mounting stud 208 and a hex nut 210. The center support 204 and 206 are connected to the fill plate 200 by a fill insert screw 212. Pin dowels 214 push shear plate 202 in reciprocal motion. The space keepers 216 are attached to the fill plate 200 by hex screws 218.

What is claimed is:

1. A hold-down tooling device comprising:
   a space keeper on a shear plate and below a fill plate;
   a hold down device placed within said fill plate and a hold down assembly center support.

2. The device of claim 1 wherein said device is placed within a product manifold.

3. The device of claim 2 wherein said device maintains dimensional integrity between said product manifold, said shear plate and said fill plate.

4. The device of claim 1 wherein said device prevents flexing of said fill plate and said shear plate.

5. The device of claim 1 wherein said device improves shearing.

6. The device of claim 1 wherein said device decreases clogging.

7. The device of claim 1 wherein said device maintains flatness of said fill plate.

8. The device of claim 1 wherein said device maintains flatness of said fill plate and said shear plate so that a cutting edge stays true and sharp edges maintain their proximity to each other.

9. The device of claim 1 wherein said device improves product fiber cutting.

10. The device of claim 1 wherein said device improves product fiber column definition.

11. The device of claim 1 wherein said device creates less drag on a mold plate at higher strokes per minute.

12. The device of claim 1 wherein said device creates a longer tooling life.

13. The device of claim 1 wherein said device eliminates mold plate chattering.

14. The device of claim 13 wherein said device eliminates mold plate chattering by creating less drag from a dimensional integrity of system.

15. The device of claim 1 wherein said device provides that said fill plate has no space or gap with said shear plate.

16. A hold down tooling device comprising:
   a fill assembly with a center hold down comprising a fill plate; a shear plate and center supports;
   said center supports having a mounting stud and nut;
   said center support connected to said shear plate and fill plate;
   space keepers attached to said shear plate.

* * * * *